United States Patent [19]
Rea et al.

[11] Patent Number: 5,932,798
[45] Date of Patent: Aug. 3, 1999

[54] CAN STRENGTH AND LEAKAGE TEST DEVICE

[75] Inventors: Keith R. Rea, Florence; John Ellis Bacon, Hartsville, both of S.C.

[73] Assignee: Sonoco Development, Inc., Hartsville, S.C.

[21] Appl. No.: 09/106,440

[22] Filed: Jun. 29, 1998

[51] Int. Cl.⁶ .................................................. G01M 3/04
[52] U.S. Cl. ............................................................ 73/49.8
[58] Field of Search ........................... 73/49.2, 49.5, 73/49.3, 49.6, 49.8, 45.4, 49.1; 138/89, 90, 92

[56] References Cited

U.S. PATENT DOCUMENTS

| | | |
|---|---|---|
| 2,828,620 | 4/1958 | Franks . |
| 3,362,225 | 1/1968 | Noble . |
| 3,693,408 | 9/1972 | Hyde . |
| 3,803,901 | 4/1974 | McConnell et al. . |
| 4,118,972 | 10/1978 | Goeppner et al. . |
| 4,393,674 | 7/1983 | Rasmussen . |
| 4,407,171 | 10/1983 | Hasha et al. . |
| 4,571,986 | 2/1986 | Fuji et al. . |
| 4,602,500 | 7/1986 | Kelly . |
| 4,753,108 | 6/1988 | Jansch ........................................ 73/49.8 |
| 4,809,751 | 3/1989 | McKenzie . |
| 4,838,075 | 6/1989 | Friedrich et al. . |
| 5,065,617 | 11/1991 | Toelke . |
| 5,596,137 | 1/1997 | Perry et al. . |
| 5,676,174 | 10/1997 | Berneski, Jr. et al. . |

*Primary Examiner*—Hezron Williams
*Assistant Examiner*—Jay L. Politzer
*Attorney, Agent, or Firm*—Alston & Bird LLP

[57] ABSTRACT

A device for leakage and pressure testing can bodies and can body-end closure combinations includes a can clamp assembly having an expandable resilient sealing ring over which an open end of a can body is slid. The can clamp assembly automatically draws the open end of the can body into a collar and then expands the resilient sealing ring outwardly to clamp and seal the can body in the assembly. Air is pumped into or drawn out of the can by an air passage formed through an actuating rod attached to the can clamp assembly for extending and retracting the sealing ring. For testing can bodies having no end closures, the device includes a second can clamp assembly which clamps and seals the other open end of the can body. A shaft attached to the second can clamp assembly is slidably and rotatably supported in an aperture of a support plate such that the can body is free to expand axially and to rotate about its axis during loading and testing of the can body.

21 Claims, 4 Drawing Sheets

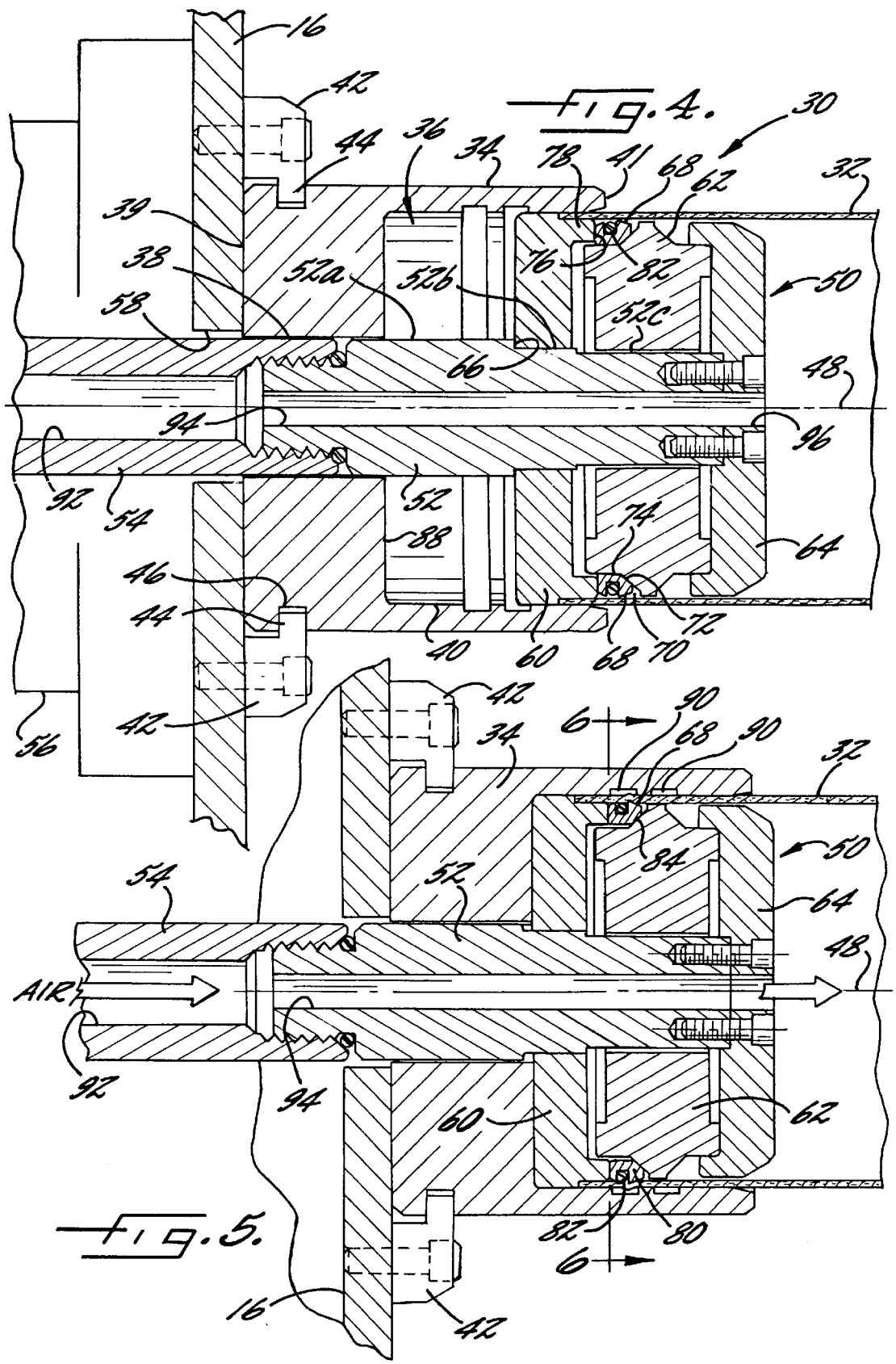

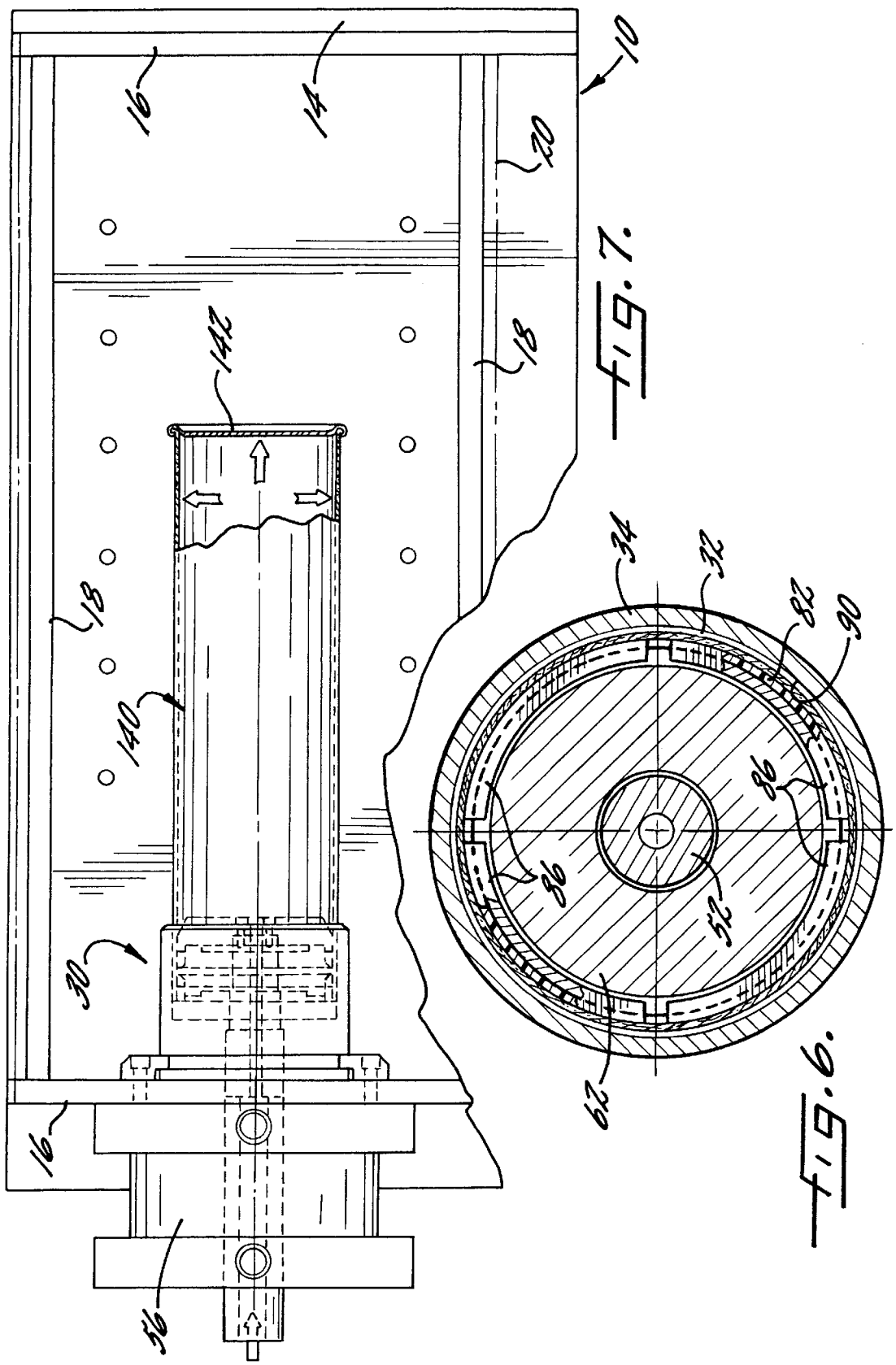

CAN STRENGTH AND LEAKAGE TEST DEVICE

FIELD OF THE INVENTION

The present invention relates to a device for testing strength and leakage characteristics of a can. More particularly, the invention relates to a device adapted to sealingly clamp an open end of a can body having the other end closed by a closure, or to sealingly clamp two open ends of a can body, and to pressurize or evacuate the interior of the can for performing burst tests, leakage rate tests, and the like.

BACKGROUND OF THE INVENTION

A variety of food products are packaged and sold in cans of the type having a cylindrical can body and a pair of end closures applied to the ends of the can body for sealing the contents in the can. The can body is typically formed of metal, paper, and/or plastic materials, and the end closures may be made of materials that are similar or dissimilar to that of the can body.

It is clearly desirable for a can to retain the integrity of its structure and seals during handling and storage of the can prior to the can being opened by the consumer. Where elevated pressures exist in the can, it is desirable that the can body not burst and the end closures remain attached and sealed on the ends of the can body until the consumer opens the can. Additionally, in some types of cans, the end closures are applied to the can body in a manner so as to intentionally permit air in the can to be vented through the end seals when the air exceeds outside pressure by a certain amount. Unless this excess pressure is properly vented, pressure in the can may build to a high enough level to cause the body to burst or an end closure to be blown off the can.

Accordingly, it is evident that it is desirable for can manufacturers and packagers to be able to control can strength and leakage characteristics. One way of facilitating such control is by testing can samples to determine such characteristics so that manufacturing or design defects may be discovered and corrected. Thorough testing requires determination of can body strength characteristics, as well as leakage and strength characteristics of a can body and end closure combination.

A can vent testing device is known from U.S. Pat. No. 5,596,137 issued to Perry et al. The device includes a mechanism for sealing against an inner surface of a can adjacent its open end to create a sealed chamber in the can bounded on the other end by the end closure. A disadvantage of the device and method of the Perry patent is that the testing apparatus and method are limited to determining leakage rate for a composite can having an end closure crimp sealed onto the end of a can body. The apparatus and method are not capable of determining strength characteristics of a can body alone, or of determining strength of a can body and end closure combination through a closure blow-off test or the like.

Another disadvantage of the device of Perry is that the sealing mechanism does not include any means for preventing the can from being blown off the sealing mechanism by air pressure in the can during testing, and therefore Perry provides a positioning bar which abuts the end closure to retain the can on the sealing mechanism. However, pressure exerted on the end closure by the positioning bar has the potential to significantly affect leakage rate through the crimp seal of a composite can, making the test results non-representative of the leakage rate of an unrestrained can.

SUMMARY OF THE INVENTION

The present invention overcomes the disadvantages of prior can testing devices as noted above, by providing a device and method for performing a variety of tests including can body strength tests, and strength and leakage tests of can body and end closure combinations. The device includes a unique can clamp assembly enabling a can to be loaded into the device and clamped to seal the can and prevent the can from being blown off the can clamp assembly during pressure testing of the can. Accordingly, a can body and end closure combination may be tested without having to exert any force on the closed end of the can, so that leakage rate may be accurately determined. Furthermore, end closure blow-off tests may be performed for determining the pressure required to blow the closure off the can body.

The invention further provides a device having a second can clamp assembly for clamping and sealing a second end of a can body, thus permitting can body strength tests to be performed, such as determination of the pressure required to burst a can body. The second can clamp assembly is a unique mechanism which permits the second end of the can body to move axially and to rotate about the can axis while maintaining the second end clamped and sealed. Particularly in spirally wound containers, such as composite containers used for packaging refrigerated dough, can body burst test results can be affected if the can body is prevented from expanding and rotating in response to internal pressure. By allowing the can body to expand axially and to rotate, the device of the invention improves accuracy of can body burst strength tests.

To these ends, the device of the invention includes a can clamp assembly including a collar having an open end which receives an open end of a can body such that the collar closely fits about the outer surface of the can body, and a seal assembly concentrically disposed within the collar and extendable and retractable along an axis of the collar. The seal assembly includes a resilient sealing ring which is expandable to clamp the can body against the collar. The seal assembly is extendable to an extended position to cause the resilient sealing ring to be positioned at the open end of the collar so that the open end of the can body may be slid over the resilient sealing ring. In the extended position of the seal assembly, the resilient sealing ring frictionally engages the inner surface of the can body such that retraction of the seal assembly causes the can body to be retracted into the collar. The device includes an actuating system connected with the seal assembly for extending and retracting the seal assembly and for causing the seal assembly to expand the resilient sealing ring to clamp the can body in the collar. An air delivery system is coupled with a passage in the can clamp assembly for pressurizing or evacuating the can.

By providing a can clamp assembly in which the can body is clamped between the collar and the expanded sealing ring, sufficient clamping pressure can be exerted by the sealing ring to prevent the can from being blown out of the can clamp assembly by internal can pressure. Accordingly, no additional can restraint is required when performing tests on can body and end closure combinations.

Additionally, the device is easily loaded simply by actuating the seal assembly to extend the sealing ring to the open end of the collar, sliding the open end of the can body over the sealing ring, and actuating the seal assembly to retract and thereby draw the end portion of the can body into the collar, and then to automatically expand the resilient sealing ring to clamp the can body in the assembly. Furthermore, unloading the can from the device is readily accomplished by reversing this procedure.

In accordance with a preferred embodiment of the invention, the seal assembly which is disposed in the collar includes first and second relatively movable portions having spaced-apart opposing surfaces collectively defining a sealing ring channel within which the resilient sealing ring resides. At least one of the opposing surfaces comprises a cam surface adapted to coact with a surface on the resilient sealing ring. Moving the first and second portions relatively toward each other causes the sealing ring to be expanded outward by action of the cam surface. Preferably, the first and second portions comprise rings coaxially spaced apart in the collar, the second ring projecting out from the collar in the extended position of the seal assembly. The second ring has an inclined cam surface, and the resilient sealing ring preferably has an inclined surface for coacting with the inclined cam surface to expand the sealing ring radially outward.

The collar preferably includes a stop positioned to be abutted by the first ring upon the actuating system partially retracting the second ring into the collar. Once the can body has been drawn into the collar and the first ring has abutted the stop, the second ring is further retracted into the collar to cause the second ring to move closer to the first ring and thereby expand the sealing ring to clamp the can body in the collar.

The device preferably includes a housing which encloses a can being tested. The housing also comprises the main support for the can clamp assembly and for the actuating system. Preferably, the actuating system includes a cylinder and piston assembly operated by fluid pressure within the cylinder to extend and retract the piston. The cylinder and piston assembly advantageously is mounted on a wall of the housing. A piston rod of the piston is connected to an actuating member which extends through a central bore in the first ring and into a central bore in the second ring and is fastened to the second ring. The actuating member has an air passage which aligns with the bore in the second ring for delivering or extracting air from the interior of a can clamped in the can clamp assembly.

To facilitate testing a can body without an end closure, another preferred embodiment of the invention includes a second can clamp assembly for sealing a second open end of the can body. The second can clamp assembly is slidably and rotatably supported by the housing so as to permit axial and rotational movement of the can. Preferably, the second can clamp assembly includes an inner sealing plug and an outer clamp ring concentrically surrounding the inner sealing plug and defining a can-receiving annular space therebetween. The outer clamp ring can be constricted to clamp a can body against the inner sealing plug. A clamp support connects the second can clamp assembly to the housing or main support of the device. The clamp support preferably comprises a shaft connected to the second can clamp assembly and extending parallel to the axis of the device along which a can is coaxially disposed, and a support plate affixed to the housing or main support and having an aperture through which the shaft extends such that the shaft is free to axially slide and rotate within the aperture. The second can clamp may be removed when it is desired to test can body and end closure combinations.

By providing a device and method capable of performing a variety of types of can tests, the invention facilitates a more thorough evaluation of can properties. Additionally, by providing a device and method for testing can bodies and can body and end closure combinations in which the can is free to move, artificial forces are not imposed on the can and/or end closure which might alter test results.

BRIEF DESCRIPTION OF THE DRAWINGS

The above and other objects, features, and advantages of the invention will be made more apparent from the following description of certain preferred embodiments thereof when taken in conjunction with the accompanying drawings, in which:

FIG. 4 is a cross-sectional view taken on a vertical axial plane, as indicated by line 4—4 of FIG. 1, through the actuating system and can clamp assembly, showing the seal assembly in an extended position and a can body slid over the resilient sealing ring in preparation for being drawn into the collar;

FIG. 5 is a view similar to FIG. 4, showing the seal assembly in a retracted position clamping the can body between the resilient sealing ring and the collar;

FIG. 6 is a cross-sectional view taken on line 6—6 of FIG. 5, showing further details of the resilient sealing ring; and FIG. 7 is a top elevational view similar to FIG. 1, showing the device set up to perform a test on a can having an end closure crimp-sealed onto one end thereof.

DETAILED DESCRIPTION OF THE DRAWINGS

Figure 1:
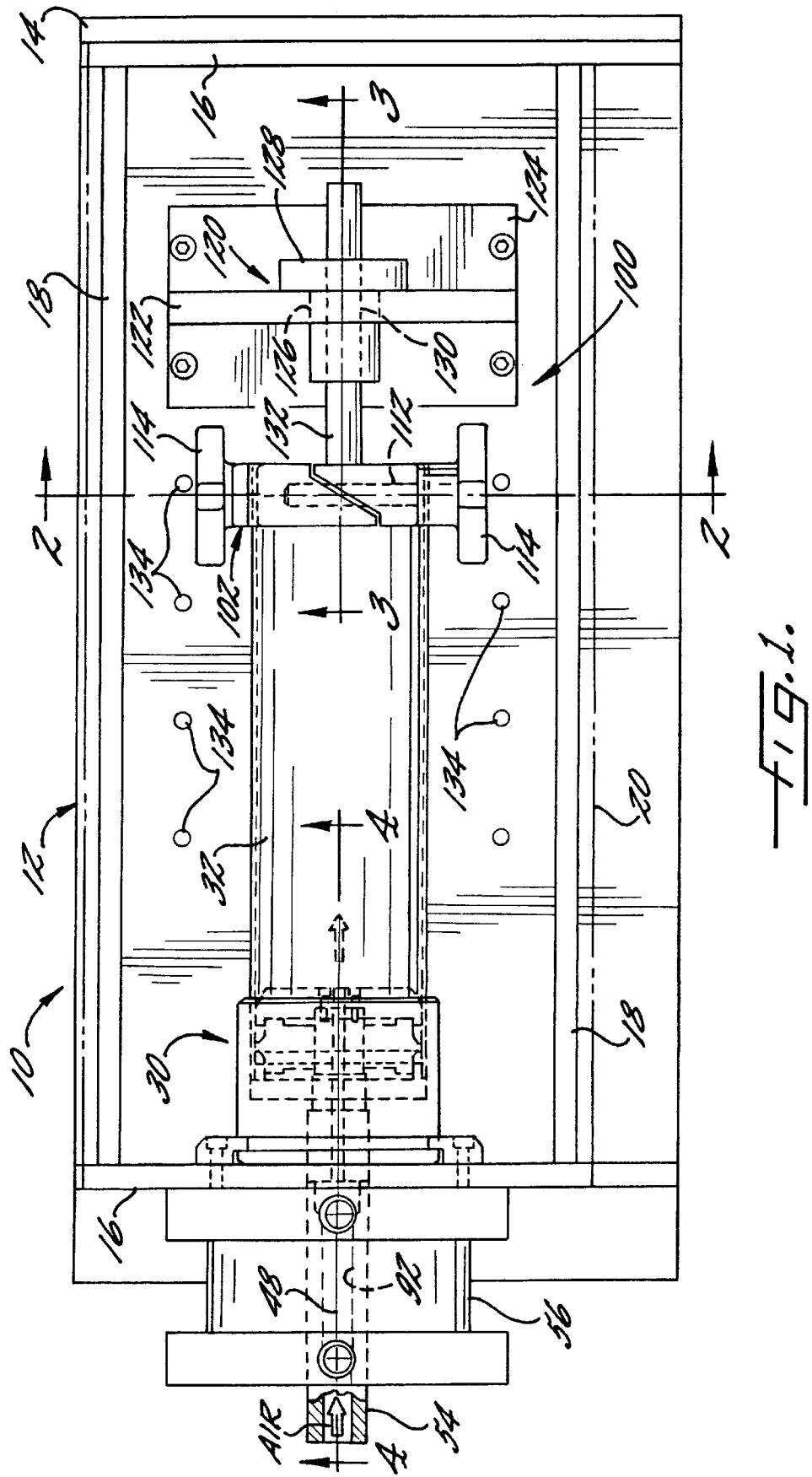
FIG. 1 is top elevational view of a test device in accordance with a preferred embodiment of the invention, showing the device set up for a can body test.

The invention is now explained by reference to a preferred embodiment thereof which is illustrated in the drawings. It will be understood, however, that the invention is not limited to the details of the illustrative embodiment described below.

Figure 2:
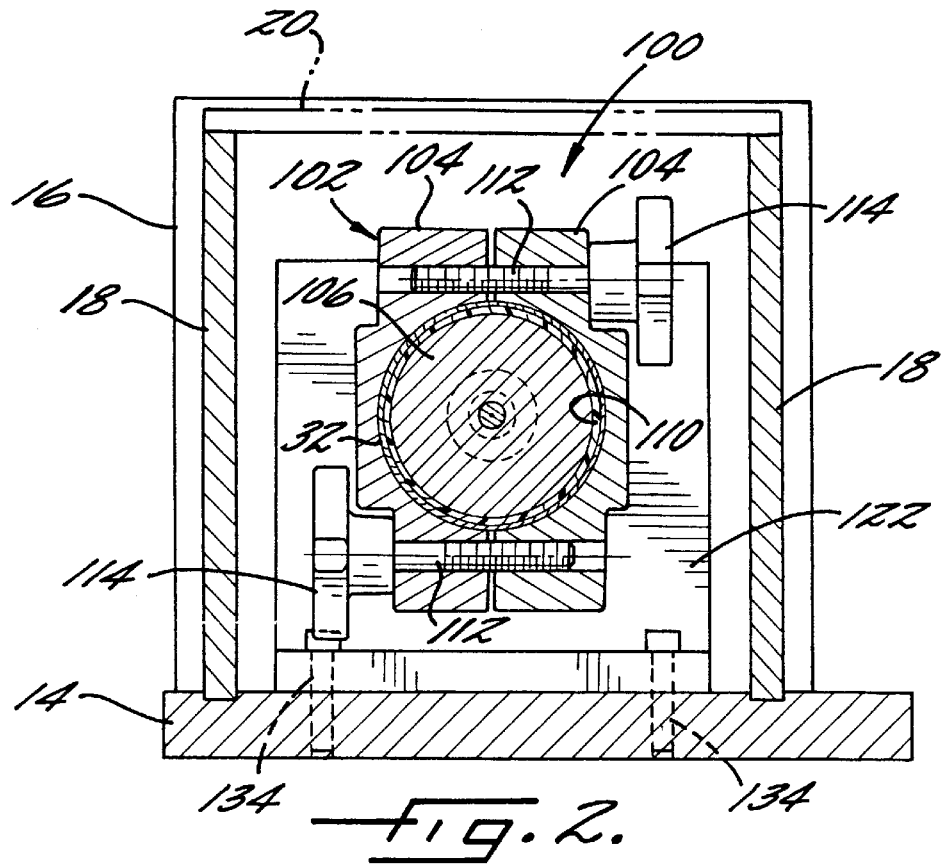
FIG. 2 is a cross-sectional view taken along the line 2—2 of FIG. 1 through the slidable and rotatable can clamp assembly.

With primary reference to FIGS. 1 and 2, a can testing device 10 in accordance with a preferred embodiment of the invention is shown. The testing device 10 includes a housing 12 defined by a base plate 14, two opposite transversely extending end walls 16 extending upward from the base plate 14, two opposite longitudinally extending side walls 18 extending upward from the base plate 14, and a transparent cover 20 removably mounted to upper edges of the end wall 16 and side walls 18. The housing 12 surrounds a can being tested so that nearby observers are protected against portions of the can which may be blown outward during can body burst tests, end closure blow-off tests, or the like. The transparent cover 20 permits viewing and/or filming of a test.

The housing 12 supports and contains a first can clamp assembly 30 which is operable to sealingly clamp and secure one end of a can body 32, and to supply air into or remove air from the interior of the can body 32 for performing pressure or vacuum tests on the can body. The housing 12 also supports and contains a second can clamp assembly 100 which is operable to sealing clamp the other end of the can body 32, and to permit the can body 32 to move axially and to rotate, as further described below.

The first can clamp assembly 30 is an actuatable mechanism that draws a can body into the assembly and then automatically expands a sealing ring to securely clamp the can body in the can clamp assembly and seal the open end of the can body. With reference to FIGS. 4 and 5, the can clamp assembly 30 includes a collar 34 comprising a generally cylindrical body having a generally cylindrical stepped bore 36 extending axially through the body. The stepped bore 36 includes a first cylindrical bore 38 of relatively smaller diameter extending into the body of the collar 34 from one end 39 thereof and terminating about midway along the axial length of the collar, and a second generally cylindrical bore 40 of relatively larger diameter extending from the inner end of the smaller bore 38 to the opposite end 41 of the collar 34. The collar 34 is secured to one of the end walls 16 by two or more arcuate ring segments 42 having radially inwardly extending flanges 44 which engage a circumferential groove 46 formed in the outer surface of the collar 34 adjacent the end 39. The open end 41 of the collar 34 projects toward the opposite end wall 16 of the housing. A central longitudinal axis 48 of the collar 34 extends generally parallel to the side walls 18 (FIG. 1).

The can clamp assembly 30 further includes a seal assembly 50 which is disposed within the larger bore 40 of the collar 34 coaxially therewith. The seal assembly 50 is axially extendable and retractable within the bore 40. FIG. 4 depicts the seal assembly 50 in an extended position, and FIG. 5 depicts the seal assembly 50 in a retracted position. An actuating member comprising a hollow rod 52 connected to the seal assembly 50 extends coaxially through the small bore 38 of the collar into the larger bore 40, and the opposite end of the rod 52 is connected to a piston rod 54 of a pneumatic cylinder 56. The piston rod 54 extends through a hole 58 in the end wall 16 of the housing 12. The actuating rod 52 has a first portion 52a having an outer diameter slightly smaller than the inner surface of the small bore 38 in the collar 34, and about equal to the outer diameter of the piston rod 54, such that the actuating rod 52 and piston rod 54 are slidable within the bore 38 for extending and retracting the seal assembly 50.

The seal assembly 50 includes a first ring 60 located proximate the inner end of the smaller bore 38. The first ring 60 is generally annular having a central hole whose diameter is smaller than the diameter of the first portion 52a of the actuating rod 52 and slightly larger than a second portion 52b of the rod such that the first ring 60 is slidable over the second portion 52b but not over the first portion 52a. The outer diameter of the first ring 60 is slightly smaller than the inner diameter of the bore 40 in the collar 34 so that the first ring is slidable within the collar.

The seal assembly 50 also includes a second ring 62 located adjacent the first ring 60. The second ring 62 is generally annular having a central hole whose diameter is smaller than that of the second portion 52b of the rod 52 and slightly larger than the diameter of a third portion 52c of the rod such that the second ring 62 is slidable over the third portion 52c but not over the second portion 52b. The outer diameter of the second ring 62 is slightly smaller than the inner diameter of the bore 40 in the collar 34 so that the second ring is slidable within the collar.

The end of the actuating rod 52 is fastened to a ring cap 64 which has an outer diameter slightly smaller than the bore 40, and preferably slightly smaller than the inner diameter of the can body 32, so that the cap 64 can freely slide within the collar 34 and so that a can body 32 may easily be inserted over the cap 64 when the seal assembly 50 is in the extended position as shown in FIG. 4. The cap 64 is adjacent the second ring 62 on the side opposite the first ring 60. Thus, it will be appreciated that by virtue of the stepped shape of the outer surface of the actuating rod 52 and the rod's attachment to the cap 64, retraction of the actuating rod 52 toward the position shown in FIG. 5 will cause the cap 64 to urge the second ring 62 into the collar 34 and toward the first ring 60, the first and second rings being relatively movable with respect to each other along the rod 52. Conversely, extension of the rod 52 toward the position shown in FIG. 4 will cause the step 66 between the first portion 52a and the second portion 52b to contact the first ring 60 and thereby move the first ring 60 toward the extended position, and the second ring 62 will be moved toward its extended position by the first ring's movement.

The seal assembly 50 further includes a resilient sealing ring 68 which resides in a sealing ring channel 70 defined between the first and second rings 60, 62. More specifically, the sealing ring channel 70 is defined between an inclined cam surface 72 of the second ring 62, a cylindrical outer surface 74 of the second ring which is joined with the radially inner end of the cam surface 72 and extends toward the first ring 60, and an annular end face 76 of the first ring 60 which opposes the inclined cam surface 72. The first ring 60 includes an axially extending annular flange 78 which projects toward the inclined cam surface 72 and which slidingly overlaps the cylindrical surface 74 of the second ring 62. Thus, the end face 76 of the flange 78 extends radially outwardly from the cylindrical surface 74, and the inclined cam surface 72 extends radially outwardly from the cylindrical surface 74 and axially away from the end face 76, the three surfaces thus defining a sealing ring channel 70 which widens in the radially outward direction. Because the first and second rings are axially movable toward and away from each other over a limited range, the sealing ring channel 70 therefore is variable in width.

The resilient sealing ring 68 comprises a split collet 80 having an outer groove retaining a continuous elastic and resilient ring 82, preferably an O-ring made of rubber or the like. The inner surface of the split collet 80 is shaped similarly to the sealing ring channel 70, and in particular includes an inclined surface 84 juxtaposed with the inclined cam surface 72 of the second ring 62. As shown in FIG. 6, the collet 80 is advantageously formed of four 90° arcuate ring segments 86 which collectively define a 360° ring structure for retaining the elastic ring 82.

It will thus be appreciated that the ring collet 80 will be expanded radially outwardly, and will cause the elastic ring 82 to likewise be expanded radially outwardly, when the first and second rings 60 and 62 are moved toward each other to force the ring segments 86 of the collet 80 to ride up the inclined cam surface 72 of the second ring 62. Accordingly, the can clamp assembly 30 seals and clamps a can body 32 in the assembly by causing such relative movement of the first and second rings toward each other, as may be seen by comparing FIGS. 4 and 5 which respectively depict the unclamped and the clamped conditions, so that the resilient sealing ring 68 expands outwardly to clamp the can body 32 between the collar 34 and the sealing ring.

The can clamp assembly 30 operates as follows. The pneumatic cylinder 56 is actuated to extend the piston rod 54 so as to extend the seal assembly 50 to the extended position as shown in FIG. 4. In this position, the resilient sealing ring 68 is positioned at the open end 41 of the collar 34, and preferably extends at least partially out therefrom. An open end of a can body 32 is slid over the cap 64, over the second ring 62 and resilient sealing ring 68, and over the annular flange 78 of the first ring 60. The outer surface of the annular flange 78 preferably is spaced radially inward of the inner surface of the collar 34 by about the thickness of the can body side wall so that the can body may be slid between the inner surface of the collar 34 and the flange 78. The end of the can body 32 abuts a radial surface of the first ring 60.

Next, the pneumatic cylinder 56 is actuated to retract the piston rod 54 so as to retract the seal assembly 50 into the collar 34. As the actuating rod 52 and cap 64 begin to move into the collar, the cap 64 urges the second ring 62 toward the first ring 60, and the resilient sealing ring 68 is carried with the second ring 62 so that it contacts and urges the first ring 60 to move into the collar along with the second ring. During the initial phase of the retraction of the seal assembly 50, the first ring 60 slides within the collar 34 without any significant hindrance, and therefore only a slight amount of axial compression force is exerted on the resilient sealing ring 68. The can body 32 is drawn into the collar 34 along with the seal assembly 50 by virtue of frictional engagement of the can body 32 with the resilient sealing ring 68.

With further retraction of the seal assembly 50 into the collar 34, the first ring 60 comes into contact with the inner end surface 88 of the bore 40 in the collar, which comprises a stop for the first ring 60. The actuating rod 52 is further retracted a slight axial distance beyond the point at which the first ring 60 makes contact with the stop surface 88. Over this last phase of the retraction motion, the cap 64 urges the second ring 62 to move axially toward the first ring 60, thereby narrowing the sealing ring channel 70 and causing the ring segments 86 of the split collet 80 to ride up the inclined cam surface 72 of the second ring 62. The elastic sealing ring 82 is thereby expanded radially outwardly to seal against the inner surface of the can body 32, as shown in FIGS. 5 and 6.

The inner surface of the bore 40 in the collar also includes one or more circumferential grooves 90 which aid in establishing a secure grip on the can body 32 by allowing the can body to be slightly deformed outward into the grooves, as shown in FIG. 5. The can body is thereby firmly clamped in the can clamp assembly 30 so that no further can restraint is needed for retaining the can in place even when relatively high internal can pressures are created.

The testing device 10 also includes means for supplying air into or removing air from the interior of a can clamped into the can clamp assembly 30. Specifically, the device includes an air passage 92 which extends longitudinally through the piston rod 54, and a corresponding air passage 94 which extends longitudinally through the actuating rod 52 and is sealingly connected to the piston rod passage 92. The ring cap 64 includes a central aperture 96 therethrough which connects with the passage 94 in the actuating rod 52. A suitable source of pressurized air or vacuum (not shown) is connected to the free end of the hollow piston rod 54 for supplying air into or drawing air out of the can via the aperture 96 in the cap 64 and the air passages 92 and 94, as shown in FIG. 5.

To permit testing a can body 32 without end closures, the device 10 also includes a second can clamp assembly 100 for sealing the opposite end of the can body. With primary reference to FIGS. 1–3, the second can clamp assembly 100 includes an outer split ring clamp 102 defined by two 180° clamp halves 104 each having a semi-cylindrical inner surface sized slightly smaller in diameter than the outer surface of the can body 32, and an inner sealing plug 106 comprising a disk-shaped member which is sized to fit closely within the can body 32 and concentrically within the split ring clamp 102. The inner sealing plug 106 has a circumferential groove 108 in its outer surface for retaining an elastic sealing ring 110. The inner sealing plug 106 is inserted into the open end of the can body 32 such that the elastic sealing ring 110 is in contact with the inner surface of the can body, and the ring halves 104 are placed about the outer surface of the can body. Threaded fasteners 112 are passed through threaded holes in the clamp ring halves 104 and tightened by turning knobs 114 so as to draw the ring halves together and constrict the split ring clamp 102 about the can body 32 to sealingly clamp the can body against the inner sealing plug 106. The can body is thus sealed and ready to be pressurized or evacuated.

Figure 3:
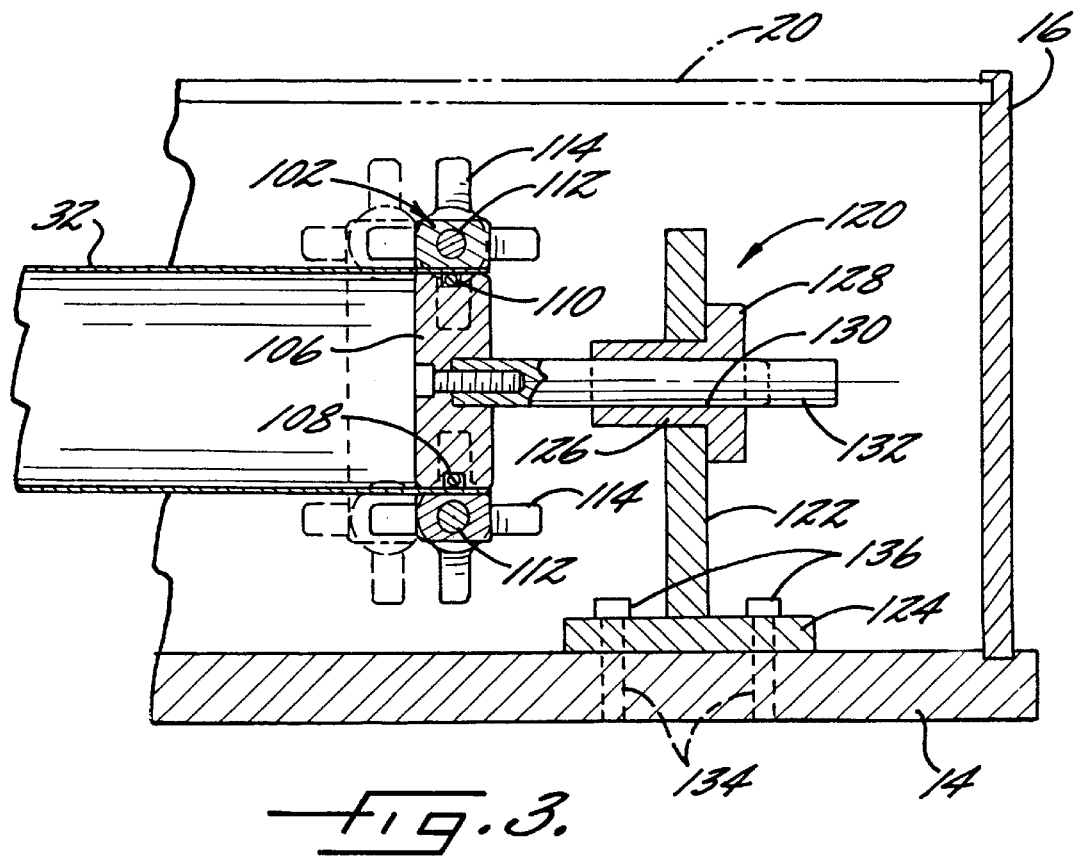
FIG. 3 is a cross-sectional view taken on a vertical axial plane, as indicated by line 3—3 of FIG. 1, through the can clamp assembly and the support assembly therefor.

The second can clamp assembly 100 includes a unique clamp support assembly 120 which permits axial and rotational movement of the can body 32 both during installation of the can body into the first can clamp assembly 30 as well as during testing of the can. The clamp support assembly 120 comprises a vertical support plate 122 mounted to the base plate 14 of the housing 12 by a horizontal mounting plate 124 attached to the lower edge of the vertical support plate 122. The vertical support plate 122 includes a hole 126 therethrough which is coaxial with the collar 34 of the first can clamp assembly. A bushing 128 is affixed in the hole 126 and includes an aperture 130 defining a bearing for a shaft 132 which is affixed to the inner sealing plug 106 of the second can clamp assembly 100. The shaft 132 extends through the aperture 130 in the bushing 128 and is slidable and rotatable therein. Thus, when the end of the can body 32 is clamped in the second can clamp assembly 100, the can body 32 is free to move axially and to rotate about its axis, which is coincident with the axis of the shaft 132. Accordingly, the can body 32 can be extended and retracted by the first can clamp assembly 30 while clamped in the second can clamp assembly 100, as indicated in FIG. 3 which depicts the second can clamp assembly 100 in both extended (solid line) and retracted (broken line) positions corresponding to the extended and retracted positions of FIGS. 4 and 5, respectively.

Furthermore, the clamp support assembly 120 permits axial expansion and rotation of the can body 32 during a test. This is important from the standpoint of accuracy of test results in certain types of tests. For example, where the can body 32 is a spirally wound paperboard can, such as the types of cans used for packaging refrigerated dough, can body burst test results can be affected if the can is not permitted to freely rotate and expand axially as the can is deformed by internal pressure in the can. By permitting this motion of the can body, the device 10 facilitates improved accuracy of such tests.

The clamp support assembly 120 may be mounted in various positions at various axial distances from the first can clamp assembly 30 so as to permit testing can bodies of various lengths. To this end, the base plate 14 includes a series of holes 134 for receiving fasteners 136 which fasten the mounting plate 124 to the base plate 14.

The device 10 is also adaptable for performing strength and leakage tests on can and end closure combinations. FIG. 7 depicts the device 10 configured for such a test. The clamp support assembly 120 and second can clamp assembly 100 have been removed to permit installation of a can 140 having one end closed by a crimp-sealed end closure 142. Once the can 140 is clamped in the first can clamp assembly 30, the interior of the can may be pressurized for performing end closure blow-off tests, can leakage tests, etc.

The device is thus capable of performing a variety of tests, including determination of the internal pressure required to burst a can body, determination of the internal pressure required to blow the end closure off the can, determination of leakage rate through a can having an end closure, and other tests. Cans of various lengths can easily be tested. Moreover, by providing several can clamp assemblies of different sizes corresponding to various standard diameters of can bodies, the device is readily reconfigurable to test cans of various diameters.

While the invention has been explained by describing a preferred embodiment thereof, and while this illustrative embodiment has been described in considerable detail, it will be understood that the invention is not limited to the details which have been described. Various modifications and substitutions of equivalents may be made to the described embodiment without departing from the scope of the invention as set forth in the appended claims. For example, while the illustrated device includes a can clamp assembly 30 in which the inclined cam surface 72 is on the second ring 62, the inclined cam surface may alternatively be formed on the first ring 60, or both rings may have inclined cam surfaces. Further, while the described device employs a pair of extendable and retractable rings 60 and 62, a suitable device could be constructed having only one ring that moves, such as the ring 62, with the expandable resilient sealing ring 68 being retained on the ring 62 by suitable means, and with the collar having means for engaging the sealing ring 68 to urge it along the cam surface 72 and thereby expand it outward. For example, the collar 34 and the ring 60 could comprise a single integral structure having the configuration as shown in FIG. 5. Other modifications and substitutions of equivalents may also be made.

What is claimed is:

1. A device for determining strength and leakage characteristics of a can having a tubular can body, comprising:

a can clamp assembly including a collar having an open end adapted to slidably receive an open end of the can body coaxially therein and to closely fit about an outer surface of the can body, and a seal assembly concentrically disposed in the collar and including a resilient sealing ring which is expandable to clamp the can body against the collar, the seal assembly being extendable along an axis of the collar to position the resilient sealing ring adjacent the open end of the collar so as to permit the open end of the can body to be slid over the resilient sealing ring, the resilient sealing ring frictionally engaging an inner surface of the can body such that retraction of the seal assembly along the collar axis causes the can body to be retracted into the collar;

an actuating system connected with the seal assembly for extending and retracting the seal assembly and for causing the seal assembly to expand the resilient sealing ring to clamp the can body in the collar; and an air delivery system coupled with a passage in the can clamp assembly for pressurizing or evacuating a can clamped therein.

2. The device of claim 1, wherein the seal assembly includes first and second portions which are relatively movable with respect to each other and are spaced apart to define a sealing ring channel therebetween, the resilient sealing ring being disposed in the sealing ring channel and adapted to be expanded outwardly by relative movement of the first and second portions toward each other to seal against an inner surface of the can body, and wherein the actuating system urges the first and second portions together to expand the resilient sealing ring outwardly.

3. The device of claim 2 wherein the first and second portions of the can clamp assembly comprise first and second rings coaxially disposed in the collar, the second ring projecting out from the open end of the collar in the extended position of the seal assembly, outermost surfaces of the first and second rings being smaller in diameter than the inner surface of the collar so as to define an annular space therebetween for receiving the can body.

4. The device of claim 3 wherein one of the first and second rings includes an inclined cam surface such that the first and second rings together define a tapered sealing ring channel, and wherein the resilient sealing ring has a tapered cross section.

5. The device of claim 4 wherein the resilient sealing ring comprises a ring collet formed as a plurality of discrete arcuate ring segments, and a continuous elastic ring encircling an outer surface of the ring collet, the ring segments being forced to ride up the inclined cam surface to expand the continuous elastic ring so as to clamp the can body against the collar.

6. The device of claim 3 wherein the actuating system includes an actuating member extending through central holes in the first and second rings and connected with the second ring for imparting axial movement thereto, the actuating member including an air passage for delivering air into the can body.

7. The device of claim 6 wherein the actuating system further comprises an actuator adapted to axially extend the actuating member within the collar so as to extend the second ring and the resilient sealing ring to the open end of the collar to permit a can body to be received over the second ring and the resilient sealing ring, and to retract the actuating member to cause the second ring to be retracted into the collar to draw the can body thereinto.

8. The device of claim 7 wherein the actuator comprises a cylinder and a piston operated by fluid pressure for reciprocatingly moving the piston within the cylinder, the piston having a piston rod attached thereto, and wherein the actuating member comprises a rod attached to the piston rod.

9. The device of claim 3, further comprising a stop positioned in the collar to be abutted by the first ring upon the actuating system partially retracting the second ring into the collar, and wherein the second ring is further retractable into the collar after the first ring has abutted the stop such that the second ring is moved toward the first ring to expand the sealing ring outwardly to seal against the inner surface of the can body.

10. The device of claim 1, further comprising a housing adapted to enclose a can being tested.

11. The device of claim 10, further comprising a second can clamp assembly for sealing a second open end of a can body to permit can body strength testing, the second can clamp assembly being slidably and rotatably supported by the housing so as to permit axial and rotational movement of the can.

12. The device of claim 11, wherein the second can clamp assembly comprises an inner sealing plug adapted to fit closely within a can body and an outer clamp ring adapted to concentrically surround the outer surface of the can body, the outer clamp ring being constrictable to clamp the can body between the outer clamp ring and the inner sealing plug.

13. The device of claim 12, further including a shaft connected with the can clamp assembly, and a clamp support which slidably and rotatably supports the shaft.

14. A device for determining strength and leakage characteristics of a can body, comprising:

a main support;

a first can clamp assembly affixed to the main support, the first can clamp assembly being adapted to engage an open first end of the can body to sealingly close the first end and to substantially restrain the first end from moving relative to the main support, the first can clamp assembly including an air passage adapted to deliver air into a can clamped in the first can clamp assembly;

a second can clamp assembly connected to the main support and spaced from the first can clamp assembly along an axis of the device, the second can clamp assembly being adapted to engage an open second end of the can body to sealingly close the second end; and a clamp support connecting the second can clamp assembly to the main support and adapted to permit the second can clamp assembly to slide parallel to the device axis relative to the main support and to rotate about a rotation axis parallel to the device axis, whereby the second end of the can is free to slide and rotate.

15. The device of claim 14, wherein the first can clamp assembly comprises:

a generally cylindrical collar having an open end adapted to slidably receive the first end of the can coaxially therein and to closely fit about an outer surface of the can;

first and second rings axially slidable within the collar and axially movable relative to each other, the first and second rings being adjacent each other and defining a sealing ring channel therebetween; and a resilient sealing ring disposed in the sealing ring channel and adapted to be expanded outwardly by relative movement of the first and second rings toward each other so as to seal against an inner surface of the can.

16. The device of claim 14, wherein the second can clamp assembly comprises an inner sealing plug adapted to fit closely within a can body and an outer clamp ring adapted to concentrically surround the outer surface of the can body, the outer clamp ring being constrictable to clamp the can body against the inner sealing plug.

17. The device of claim 16, wherein the clamp support comprises a shaft connected to the second can clamp assembly and extending parallel to the axis of the device, and a support plate affixed to the main support and having an aperture through which the shaft axially extends such that the shaft is free to axially slide and rotate within the aperture.

18. A method of testing a can to determine strength and leakage characteristics of the can, comprising:

sliding an open end of the can over a resilient sealing ring of a can clamp assembly with a body of the can being frictionally engaged by the resilient sealing ring;

retracting the resilient sealing ring axially into a cylindrical opening of a collar such that a first end of the can body is axially drawn into the collar by the resilient sealing ring and the can body is closely adjacent an inner surface of the collar;

expanding the resilient sealing ring radially outward after the end portion of the can body has been drawn into the collar so as to cause the resilient sealing ring to sealingly clamp the can body between the inner surface of the collar and the resilient sealing ring;

sealing a second end of the can body; and pressurizing or evacuating the can.

19. The method of claim 18, wherein the retracting step further comprises supporting the resilient sealing ring between first and second rings which define a sealing ring channel therebetween within which the resilient sealing ring resides, and retracting the first and second rings into the collar so as to retract the resilient sealing ring thereinto.

20. The method of claim 19, wherein the expanding step further comprises abutting the first ring against a stop in the collar to cease the retraction of the first ring, and retracting the second ring further into the collar after the first ring has abutted the stop so as to move the second ring axially toward the first ring and cause the resilient sealing ring to be expanded outward into sealing engagement with the can.

21. The method of claim 20, wherein the step of supporting the resilient sealing ring further comprises supporting the resilient sealing ring between opposing surfaces of the first and second rings at least one of which surfaces is inclined so as to define a tapered sealing ring channel, and wherein the expanding step comprises moving the second ring toward the first ring to cause the tapered sealing ring channel to be narrowed and the resilient sealing ring to slide along the inclined cam surface.

* * * * *